United States Patent
Av et al.

(10) Patent No.: US 12,423,322 B2
(45) Date of Patent: Sep. 23, 2025

(54) DYNAMIC REPLICATION SERVICE EXECUTION USING DATA CHANGE METRICS

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 18/352,274

(22) Filed: Jul. 14, 2023

(65) Prior Publication Data

US 2025/0021578 A1 Jan. 16, 2025

(51) Int. Cl.
*G06F 15/16* (2006.01)
*G06F 11/14* (2006.01)
*G06F 16/27* (2019.01)

(52) U.S. Cl.
CPC .......... *G06F 16/27* (2019.01); *G06F 11/1453* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 9,164,691 B1* | 10/2015 | Chopra | ................... | G06F 3/067 |
| 10,095,800 B1* | 10/2018 | Yalamanchi | .......... | G06F 16/972 |
| 10,459,648 B1* | 10/2019 | Menezes | ................ | G06F 3/0619 |
| 11,395,134 B2* | 7/2022 | Dunjic | ................... | G06Q 20/08 |
| 2012/0203742 A1* | 8/2012 | Goodman | ............. | G06F 16/128 |
| | | | | 707/649 |
| 2021/0377016 A1* | 12/2021 | Perlman | ................ | H04L 9/0891 |
| 2022/0179748 A1* | 6/2022 | Agarwal | ............ | G06F 11/1456 |
| 2024/0202078 A1* | 6/2024 | Ur Rahman | ........... | G06N 20/00 |

\* cited by examiner

*Primary Examiner* — Alex Gofman
(74) *Attorney, Agent, or Firm* — Staniford Tomita LLP (57) ABSTRACT

A dynamic replication service using a data change metric to select an optimum cloning method that reduces latency of data copying. A model is trained using historical data of backup operations of the saveset to establish past data change metrics for corresponding replication services processing the saveset. The best cloning method for the replication service is selected by using a calculated data change rate of the data saveset, as expressed as a number of bytes changed per unit of time, from among a plurality of different cloning methods based on the data change rate. The service executes the selected cloning method for the replication service to copy the data for storage or further processing.

14 Claims, 5 Drawing Sheets

400

| CLONING METHOD | THRESHOLD VALUE | INITIATION TIME |
|---|---|---|
| PARALLEL | 1- 100 MB | Replication in parallel |
| SERIAL | <10Kbits | Replication subsequent |
| SCHEDULED | >1MB | Scheduled time |
| MANUAL | Any | Manually triggered time |
| SAVESET | >10Kbits | Complete Saveset at a time |
| VOLUME | >10Kbits | Complete Volume at a time |

100

STORAGE/BACKUP
MANAGEMENT
PROCESS
112

Dynamic
Replication Using
Data Change Rate
120

102

Storage
Server

124

NETWORK STORAGE

114

NETWORK
110

104

VM STORAGE

108

DATA SOURCE

DATABASE
PROCESSES
116

106

DB
Server

CLIENTS
224

STORAGE
SYSTEM
206

NETWORK
210

Metadata

Backup Data

BACKUP
SERVER
202

DYNAMIC
REPLICATION
PROCESS
- Cloning Process
Selector
220

BACKUP
MANAGEMENT
PROCESS
212

FIG. 2

Incoming Data Blocks 301

DYNAMIC REPLICATION SERVICE COMPONENT 301

DATA RECEIVER 302

DATA CHANGE RATE ESTIMATOR 304

Data Change Rate 303

RULE SELECTION 306

MODEL 308

REPLICATION ENGINE - Cloning Process 310

| CLONING METHOD | THRESHOLD VALUE | INITIATION TIME |
|---|---|---|
| PARALLEL | 1- 100 MB | Replication in parallel |
| SERIAL | <10Kbits | Replication subsequent |
| SCHEDULED | >1MB | Scheduled time |
| MANUAL | Any | Manually triggered time |
| SAVESET | >10Kbits | Complete Saveset at a time |
| VOLUME | >10Kbits | Complete Volume at a time |

Receive data blocks for saveset to be replicated
502

Determine Data Change Rate for incoming data based on model
504

Select optimum cloning method from possible methods based on data change rate
506

Execute selected cloning method for replication service
508

DATA COLLECTION
602

TRAINING
604

Database
611

Historical Data
615

AI-Based Classifier
617

INFERENCE ENGINE
606

DYNAMIC REPLICATION SERVICE EXECUTION USING DATA CHANGE METRICS

TECHNICAL FIELD

Embodiments are generally directed to large-scale backup systems and more specifically to selecting a cloning method for data replication services using data change metrics.

BACKGROUND

Data protection involves backing up data for storage and restoration in case of system failure. Data can be copied or cloned from a data source (backup client) to a storage target through a backup server. With ever increasing amounts of data and the need for scalability in enterprise level data systems, the data to be backed up and restored can vary widely with regards to backup requirements and preferences. In a typical data protection scenario, a backup administrator may be provided with many multiple different variations of cloning or replication methods. Each of them suited to a different use case.

It is important that the correct policy be associated with the appropriate client and data saveset, such as through a tag or policy associated with the data. However, it is imperative to ensure the other parameters, such as data change and data impact to the user are considered when deciding on the kind of clone/replication policy to be configured. In present systems, this is a tedious and error prone task that is often left to the administrator alone.

What is needed, therefore, is a system and method that uses a data change measure as a parameter to help select an appropriate copying or cloning operation in large-scale data protection systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning classification processes using data change measures to help select appropriate data cloning methods for a data protection process. Such embodiments overcome the issues associated with present methods including the administrator burden of configuring and selecting cloning and replication methods and the errors that often result from present practices.

A dynamic replication service using a data change metric selects an optimum cloning method that reduces latency of data copying. A method trains a model using historical data of backup operations of the saveset to establish past data change metrics for corresponding replication services processing the saveset, and selects the cloning method for the replication service by determining a data change rate of received data, as expressed as a number of bytes changed per unit of time. It selects the cloning method from among a plurality of different cloning methods based on the data change rate, and executes the selected cloning method for the replication service to copy the data for storage or further processing.

Embodiments are directed to an intelligent solution to defining and selecting data cloning/replication methods that uses certain artificial intelligence (AI) and machine learning (ML) based solutions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

As stated above, most data protection operations involve datasets that are subject to many different variations of cloning or replication methods and that require configuration by manual (system administrator) functions, thus imposing processor and personnel overhead and potentially introducing sources of errors. Embodiments include a replication process that uses a data change rate estimator to help determine an optimum cloning method for use in a data protection operation.

Figure 1:
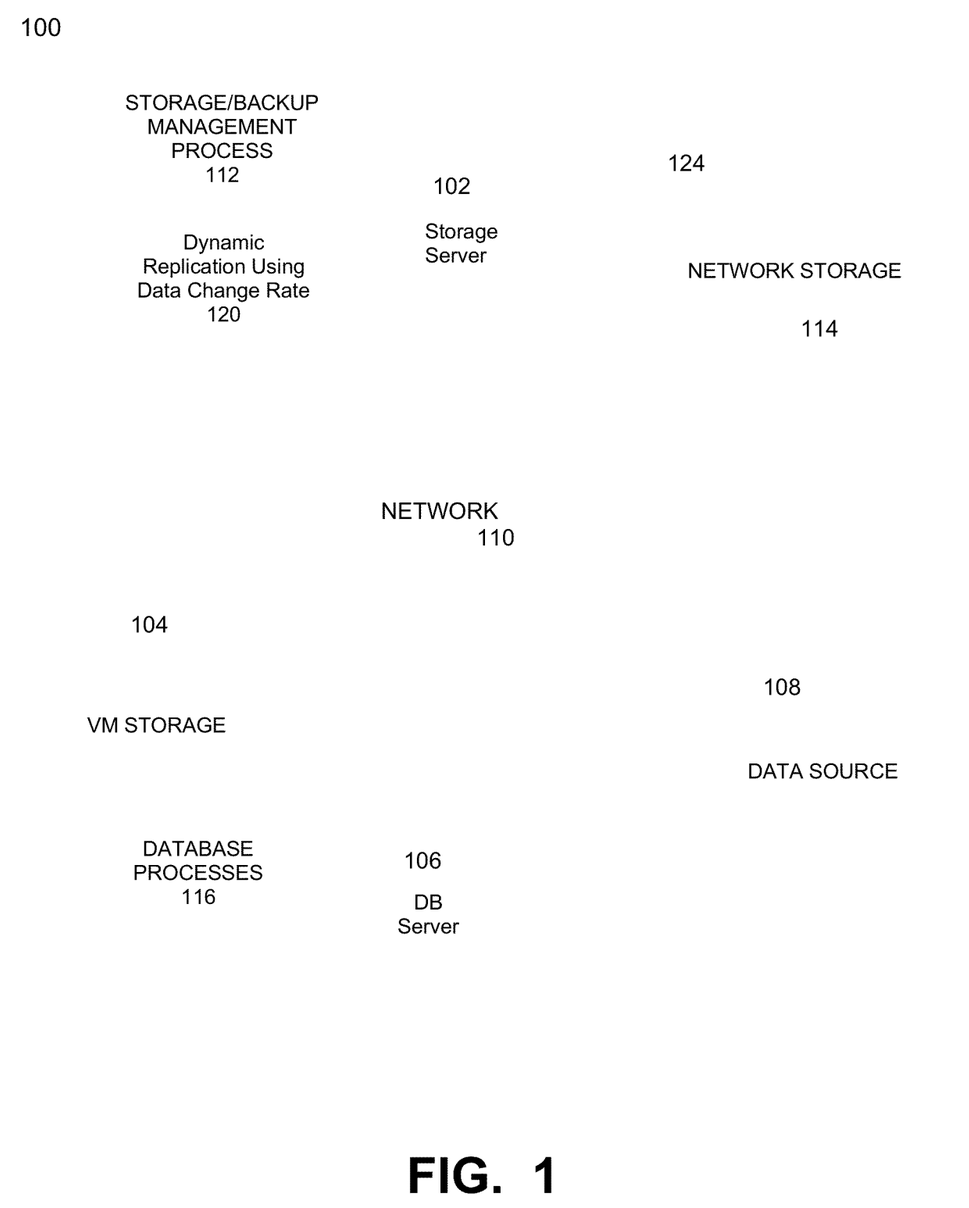
FIG. 1 illustrates a computer network system that implements one or more embodiments of a backup system using supervised learning to implement dynamic replication services using data change metrics.

FIG. 1 illustrates a computer network system that implements one or more embodiments of a backup system using supervised learning to implement dynamic replication services using data change metrics to select a cloning method. In system 100 of FIG. 1, a storage server 102 executes a data storage or backup management process (or "backup program") 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes a dynamic replication process/component 120 for applying appropriate replication operations using data change rate metrics (measures).

Figure 2:
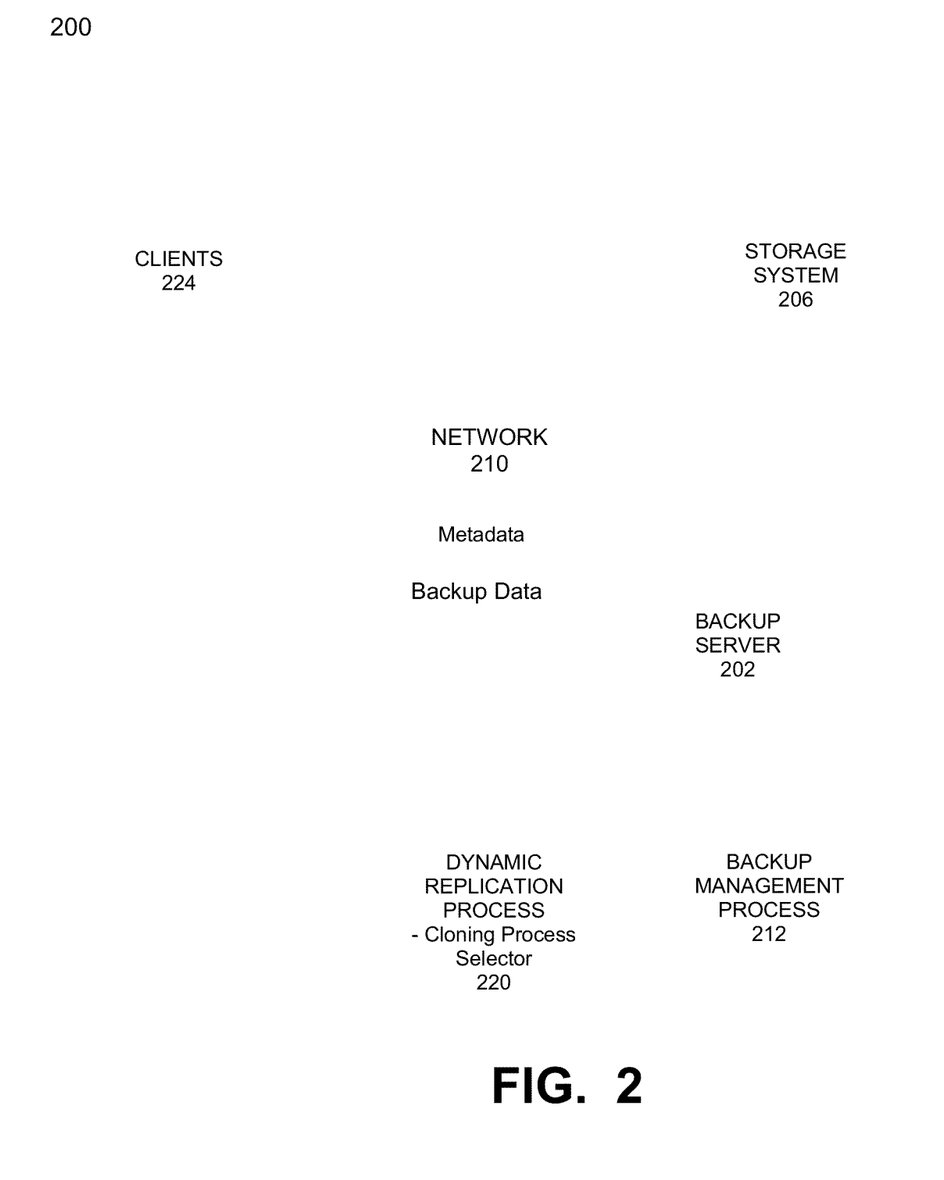
FIG. 2 illustrates a backup system with a variety of different backup clients generating data to be protected, under some embodiments.

In many a typical large-scale data protection system, there can be many different types of backup clients, each generating different data objects at different times to be included in one or more data savesets. FIG. 2 illustrates a backup system like that of FIG. 1, but with a variety of different backup clients 224, ranging from computers, laptops, mobile devices, network devices, servers, and so on, all backing up data and metadata over network 210 through backup server 202 to storage system 206 using a backup program 212. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client 224 may thus generate different data that maybe subject to different protection policies based on data type, importance, volume, storage requirements, and so on. In present systems, defining appropriate backup policies for each data type generally requires manual policy definitions by a user or system administrator.

Embodiments of systems 100 and 200 include respective dynamic replication processes 120 and 220 that dynamically and automatically identify and apply appropriate data cloning or other replication operations based on the rate of change of the relevant data in a saveset. Embodiments described below may apply to either component 120 in the basic backup system of FIG. 1, or component 220 in the multi-client backup system of FIG. 2.

Data cloning generally refers to a method of snapshot copying real data and to create fully functional copies for the disaster recovery storage, rapid provisioning of development and test environments, or other similar uses. There are four primary steps involved in any cloning operation: (1) ingesting the source data, (2) snapshotting the data, (3) cloning/replicating the data, and (4) provisioning the data to the storage or test/development platform.

Depending on the system configuration, cloning is typically achieved using ZFS or HyperV technologies as opposed to traditional backup and restore methods. ZFS is a file system that provides for data integrity and snapshotting, and is available for many major OS platforms; and HyperV is virtualization platform from Microsoft that can be used to create and manage virtual machines.

Clones are often used to copy development and testing data without affecting production data. Backups are typically taken manually and can take hours or days to complete. This means that the data is not available for use during this time period, which can be problematic if the data needs to be accessed immediately. Besides time requirements, storage is another constraint. Since a clone backup is a 100% copy of the original, multiple copies take up a proportionate amount of storage. Data cloning can be used or various applications, such as backup operations, data migration, data analysis, or system upgrades or similar purposes. For example, data clones can be used to provision new databases and test changes to production systems without affecting the live dataset.

Various different types of cloning methods may be used, and the amount of time and data storage required for each may differ as compared to the others. In an embodiment, the dynamic replication process 220 is configured to work with at least six of the popular methods of cloning. These different cloning methods include:

(1) Parallel cloning: while the backup is in progress, as soon as the savesets are rolled over to primary storage, the replication also would have started in parallel.
(2) Serial cloning: once the backup is done, then the cloning of the savesets would start.
(3) Scheduled cloning: the cloning is scheduled to a particular time and time range of the data backups. The range of backups would be picked for the cloning of data.
(4) Manual cloning: the savesets are manually triggered for adhoc replication from the primary storage device.
(5) Saveset cloning: the complete saveset with a time range or size range is considered for cloning.
(6) Volume cloning: the complete volume level data is transferred for cloning.

Other suitable types of cloning procedures may also be used depending on system configuration and requirements, thus resulting in several different cloning methods that may be available to a replication service or data protection system. In present systems, selecting the optimum cloning method is usually a tedious manual procedure undertaken by the system administrator. Embodiments include a dynamic replication process 220 that includes an automatic cloning method selector.

In an embodiment, the cloning method is chosen using a metric embodying the rate of data change of a dataset (or data asset) processed by the replication process. The rate of data change of a saveset is measured to drive a metric referred to herein as a "data change measure" or "data change metric." This metric is then used to help determine the appropriate cloning process to apply for a particular replication service. The data change measure is thus used as a parameter to decide the cloning process to be applied for the replication service. For example, if the backup administrator wants to clone only backup copies with a data change greater than a certain size, the data change measure can be used to help select a specific method of cloning, such as from among the six method (1-6) listed above. In this case, the data change measure can be the only metric or an additional metric additional metric provided to a rule selection component used by the administrator when decide upon a cloning method.

Figure 3:
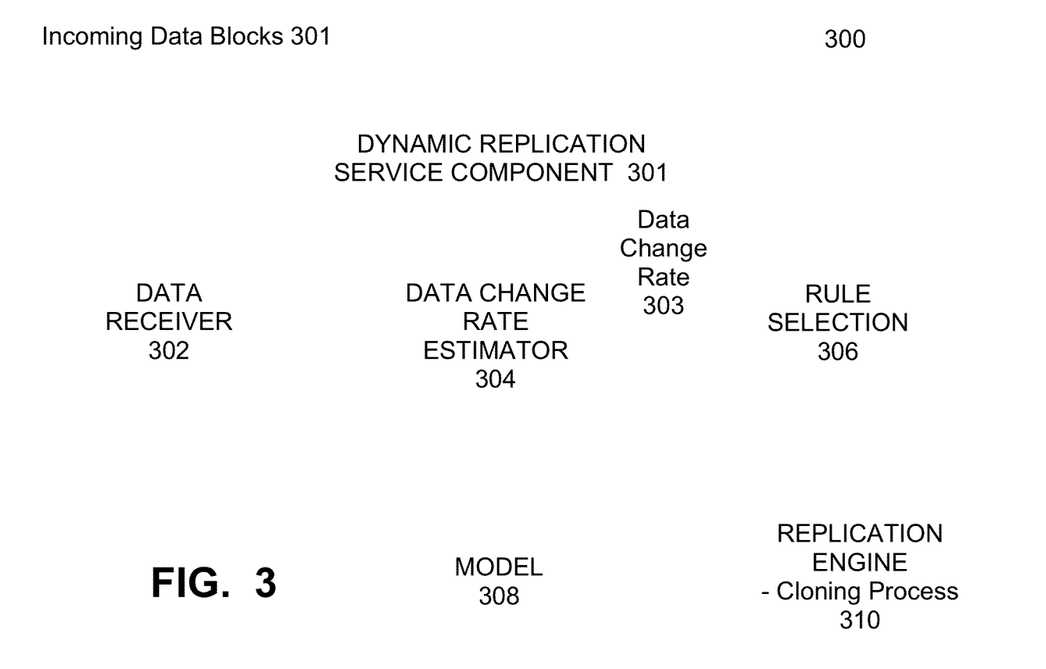
FIG. 3 is a block diagram of a dynamic replication service component, under some embodiments.

FIG. 3 is a block diagram of a dynamic replication service component using a data change metric, under some embodiments. As shown in FIG. 3, system 300 includes a dynamic replication service component 301 that executes a particular cloning method selected for the replication service. A data receiver 302 is an interface component that receives incoming data blocks 301 for data that is to be cloned/copied through the replication service according to one of several different cloning methods. The incoming data blocks are analyzed by a data change rate estimator component 304 to determine a current rate of change as compared with historical data provided by a model 308.

In an embodiment, the estimator 304 is an analytical unit using a bit map that is created for the dataset being processed and which is compared with the bit map from the last incremental/full backup to detect the changes in the bit map of the dataset. For example, if there is a volume c:\ being replicated, a bitmap of the drive is fetched from the current time instant and compare it with historical data i.e., the bitmap from the last successful backup or a tuned time interval from the end user input, whichever is earlier. Also, along with the last bit map, any historical data changes from the present asset would be calculated using the model in place. With this comparison, the analytical unit would determine the data changes and parameter changes (e.g., size of changes, data rate, etc.). The historical data provided by a model is a micro-unit of the estimator 304 that works as an AI-based analytical model to hold the historic bit map data of the data object under consideration. When a model 308 is referenced, it is the estimator in conjunction with the model that is holding the historic bit map data.

Any fitting AI algorithm to detect data changes from historic data or bit maps can be used for this embodiment. The estimation here is a quantifiable metric rather than a quality measure, and is done using the bit map of current time and bit map of the last successful backup in regular interval times historically. The analytical unit has an AI model that is trained with historic data to hold a proper bit map data change that could be potentially used as a reference to compare with the current bit map changes. The historical bit map data would inform only the reference for a bit map change comparison from the past data changes in the data unit.

In an embodiment, system 300 calculates the amount of data that has changed based on historic replication operations to determine a baseline replication cycle. For example, if an organization intends to replicate data every hour, the system will calculate the average data change from previous replications and use that calculation to decide when the next replication cycle should occur.

In general, the estimator 304 does the work of data change estimation, and the system 300 makes the replication decisions using the data change rates estimated. The estimator has a AI model 308 that is trained with historic data to hold a proper bit map data change that could be potentially used as a reference to compare with the current bit map changes. Historical bit map data would inform only the reference for a bit map change comparison from the past data changes in the data unit, and the estimator then takes care of the calculation.

Using the bitmap of the current time and the bitmap of the last successful backup made during regular time intervals, the estimator component 304 calculates a data change rate metric 303, which is a quantifiable value rather than a qualitative characteristic. This metric is then passed to a rule selection component 306. For a change rate, this metric is expressed as a number of bytes changed per unit time (bytes/time), where the time period may be configured based on system configuration and needs. For example, if the data change rate calculation shows that there was a data change of 100 GB per hour, then the data change rate metric 303 would be 100 GB, regardless of when the last replication occurred. This metric is dynamic and may change depending on the organization's data load. Users can also adjust this metric to choose a replication cycle that suits their needs.

The data change rate 303 is then compared with one or more threshold values to select the cloning method to implement the replication service. Each of the six or more cloning methods described above may have a different threshold value associated with the respective method. The data change rates can be stored in a database accessible to the rule selection component 306.

Figure 4:
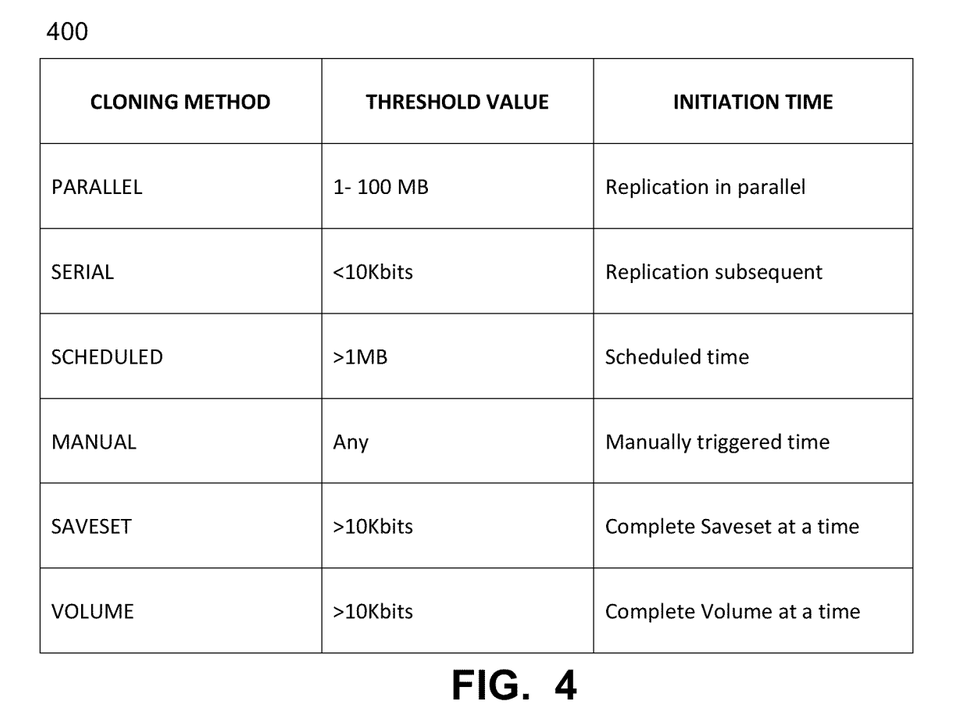
FIG. 4 is a table illustrating some cloning methods with corresponding example threshold values, under some embodiments.

FIG. 4 is an example database table 400 illustrating some cloning methods with corresponding example threshold values, under some embodiments. As shown in FIG. 4 and described above, each cloning method defines a copying process and a time to initiate the data copying. For example, parallel cloning initiates the copying in parallel with a backup, while serial cloning initiates after completion of the backup. The scheduled cloning initiates upon a defined schedule, while manual cloning starts upon a manual trigger. Saveset cloning copies the complete saveset within a specified time range, and volume cloning copies an entire volume within a specified time range.

For the example of FIG. 4, table 400 lists some example threshold ranges suitable to invoke a corresponding cloning method of the six listed methods. As shown in the table, a data change rate of 1 to 100 MB could result in parallel (concurrent) cloning being selected, whereas sequential cloning might instead be selected if the data change rate is on the order of 0 to 10 Kbits, due to a resource rich processing capacity. Similarly, for changes on the order of millions of bitmaps (i.e., greater than 1 MB, scheduled cloning is preferred to provide a dedicated replication storage pool to facilitate the huge chunks of data. For more than 10 Kbit changes, volume-level or saveset-level cloning may be selected, and for manually triggered cloning, any appropriate data change rate may be a threshold.

The cloning methods and threshold values shown in FIG. 4 are provided for purposes of example only, and other methods and threshold values may be used depending on system configuration and applications.

Because the different cloning methods start using different starting times and time periods, they incur a latency that might be needed to perform the data copying or too long to optimize the replication operation. In an embodiment, the optimum cloning method selected by the rule selection component 306 is chosen based on the minimum latency imposed by the selection. That is, the selected cloning method imposes the least latency on the system based on the data change rate 303 for the data blocks 301 to be copied, but yet allows the copying to be successfully performed.

Using the table 400, the rule selection component 306 selects the cloning method that meets or exceeds the corresponding threshold value. For example, {"if Data change>10 Kbits bytes: use "Saveset_Clone""}. This type of rule is defined in the rule selection component 306 and selected upon comparison of the data change rate 303 for the incoming data blocks 301 with the defined thresholds to select the appropriate cloning method.

The same metric can also be used to define a storage policy in specific to the replication/cloning method. Similarly, the available data change metric can be leveraged as a defining parameter in rule dependent service scenarios within the backup application. For example, this same metric can be utilized for multiple different operations across the product to provide better SLA to the user, especially during the tiering and cloud migrations.

In an embodiment, the data change rate can be represented as an absolute value along a range defined by the threshold values, such as in table 400, and any appropriate unit may be used depending on the characteristic that is measures, such as number of bytes per unit time. Alternatively, it may be represented as a percentage of change relative to a baseline value defined by the model 308.

For the embodiment shown in FIG. 3, system 300 makes use of use of historical data from users that train a model 308 to decide the selection of an appropriate cloning method with the best latency characteristics for cloning the datasets being processed. This system makes use of the historical data from the user environments (or laboratory scenarios) to decide on the closest match to defined cloning methods to select the optimum method for cloning the data. The historic bit map is generally accurate and can give a fair idea of the data change estimations, which is then used by the estimator 304 and replication engine to ultimately select best fitting clone method. The selected cloning method is the one that imposes the least latency on the system based on the data change rate for the incoming data blocks. This selected cloning method is then executed by the replication engine 310, which applies the cloning method selected by the rule selection component 306.

Different data change numbers thus trigger different rules and cloning methods. As stated above, the model calculates the amount of data that has changed based on historic replications. In an embodiment, the data change rate is used to determine an appropriate replication cycle based on the initiation time of the selected cloning method. For the example mentioned above, if an organization intends to replicate data every hour, the model will calculate the average data change from previous replications and use that to decide when the next replication cycle should occur. If the calculation shows that there was a data change of 100 GB per hour, then the data change metric would be 100 GB, regardless of when the last replication occurred.

Figure 5:
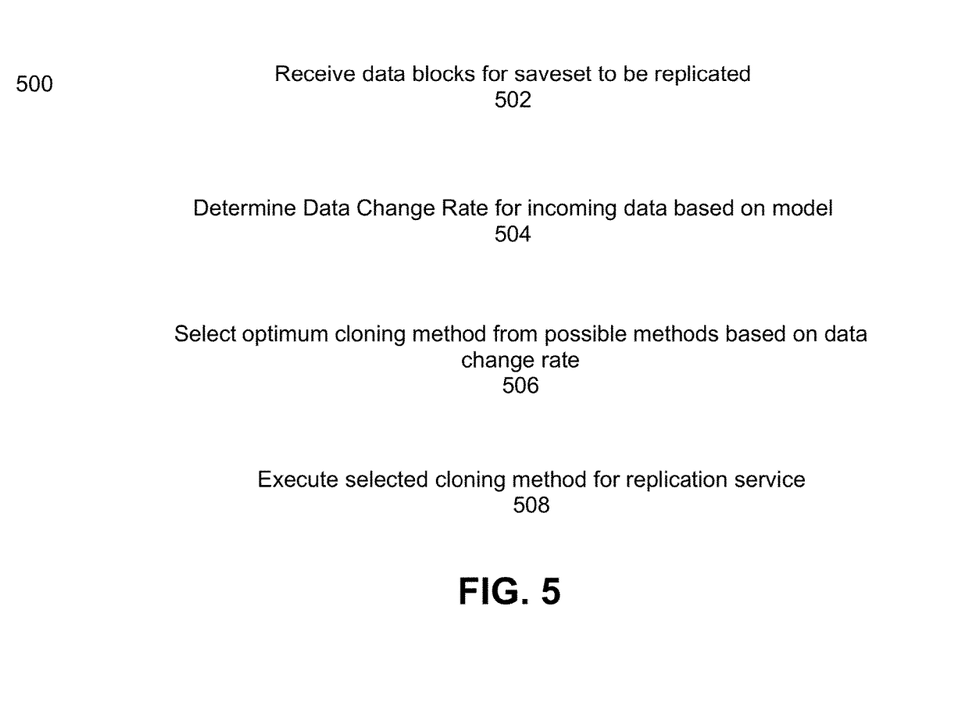
FIG. 5 is a flowchart that illustrates a method of selecting a cloning method for replication services using a data change rate measure, under some embodiments.

FIG. 5 is a flowchart that illustrates a method of selecting a cloning method for replication services using a data change rate measure, under some embodiments. As shown in FIG. 5, process 500 starts in step 502 with the receiving of data blocks for data savesets to be replicated through services including data cloning. The data may be any appropriate data elements, such as a virtual machine, filesystem, database, document, and so on.

In step 504, the estimator component 304 uses a model 308 to calculate the data change rate 303 of the incoming data. The model uses a complete or near-complete history of changes to the dataset and derives a bit map change metric as a reference for comparison and estimation. This provides a much better estimation than a straight calculation of data change rate for the present data set, which would only use the current and last bitmap from a last backup.

The data change rate measure 303 is then used in step 506 to select an optimal cloning method from among a plurality of possible cloning methods. The optimal cloning method is the one that minimizes the latency incurred by the cloning process, but that still allows the entire copying process to occur within a specified or required time period. The selected cloning method is then executed by a replication engine or backup server to fulfill the replication service, 508.

In an embodiment, certain supervised learning methods can be used to generate or use model 308. As used herein, "supervised learning" refers to a subcategory of machine learning (ML) and artificial intelligence (AI) that is defined by the use of labeled datasets to train algorithms that to classify data or predict or estimate outcomes accurately. In an embodiment, the KNN process is used for the data classification to classify current and new data objects with respect to criticality and backup/restore prioritization within an overall data protection process.

In an embodiment, the dynamic replication service component 301 utilizes certain artificial intelligence (AI) and machine learning (ML) processes to evaluate new data objects using various attributes, such as data change size, data change rate, bit map count, bit map size etc., to generate the model 308. Such a process generally uses a training component that continuously trains a machine learning algorithm.

Figure 6:
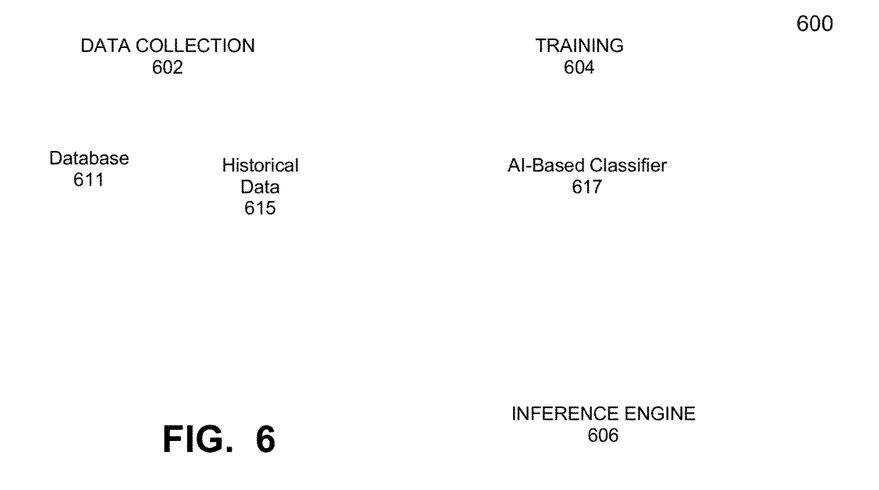
FIG. 6 illustrates a general AI/ML component used in a dynamic replication service component, under some embodiments.

FIG. 6 illustrates a general AI/ML component used in a dynamic replication service processing component, under some embodiments. System 600 of FIG. 6 includes a data collection component 602, a training component 604, and an inference component 606. The data collection component 602 can comprise various data loggers and I/O capture devices and databases 611 along with a body of historical information 615 about past data objects, clients, and events (e.g., backup operations). The data collection component 602 continuously monitors and collects data objects and event data to build up its database. This collected information is submitted to the training component 604 through an AI-based analyzer 617. This component continuously trains a machine learning algorithm to identify the data object attributes to thereby determine a cloning method for the new data object and/or client. The inference engine 606 also continuously trains the AI/ML algorithms through monitored events.

The AI component of system 600 may employ any suitable AI algorithm, such as a fitting algorithm to derive the data change metric. In general, the performance required to handle the vast variation of data source types and huge size of the big data involved, which may be in zeta bytes of range, may be achieved with low latency and high throughput through embodiments described herein. Such AI mechanisms may be scaled and modified for different application needs and system configurations.

Figure 7:
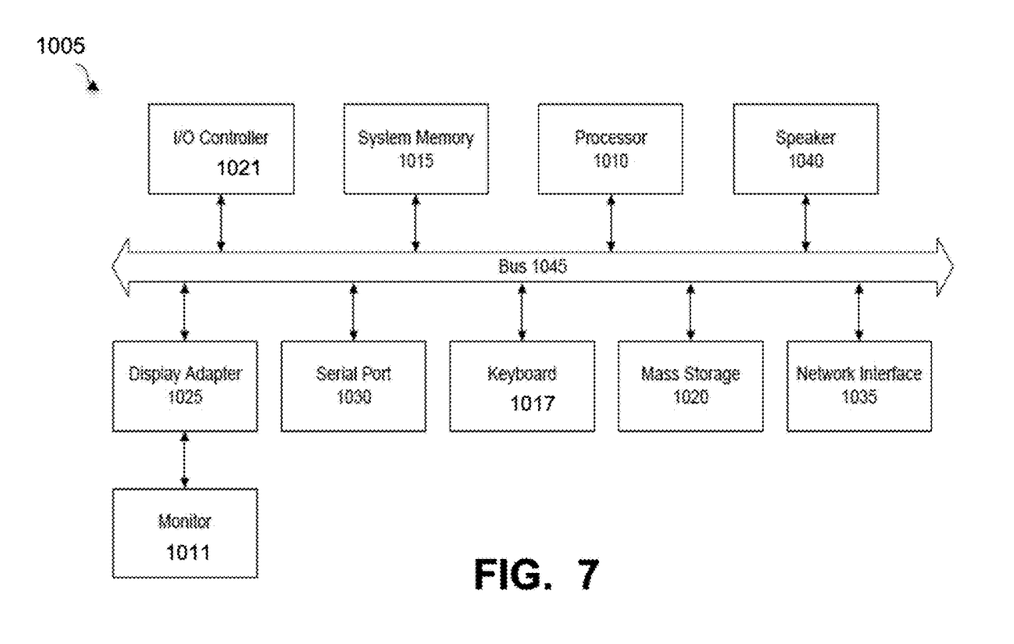
FIG. 7 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 7 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of selecting a cloning method for a replication service in a data protection system, the method comprising:
   receiving the data of a saveset utilizing the replication service;
   determining a data change rate of the data, as expressed as a number of bytes changed per unit of time;
   selecting the cloning method from among a plurality of different cloning methods based on the data change rate, each performing a respective data replication operation at a defined time relative to a backup operation, and comprising parallel replication, serial replication, scheduled replication, manual replication, saveset replication, and volume replication;
   defining a plurality of threshold ranges to select a cloning method from among the plurality of cloning methods;
   selecting parallel replication if the data change rate is within a first threshold range, or serial replication if the data change rate is within a second threshold range, or scheduled replication if the data change rate is within a third threshold range, or one of saveset or volume replication if the data change rate is within a fourth scheduled threshold range; and
   executing the selected cloning method for the replication service to copy the data for storage or further processing.

2. The method of claim 1 wherein the parallel replication copies the data in parallel with the backup operation, the serial replication copies the data after the backup operation, the scheduled replication copies the data at a scheduled time, the manual replication copies the data upon a manual trigger, the saveset replication copies the data saveset within a defined time range, and the volume replication copies a volume of the data saveset within the defined time range.

3. The method of claim 2 wherein each of the different cloning methods initiates the data copying at a respective defined time that imposes a corresponding latency to the replication operation.

4. The method of claim 3 wherein the selected cloning method minimizes an overall latency of the replication operation relative to other cloning methods of the plurality of cloning methods.

5. The method of claim 4 further comprising training a model using historical data of backup operations of the saveset to establish past data change metrics for corresponding replication services processing the saveset.

6. The method of claim 5 wherein the model utilizes an artificial intelligence (AI) based component comprising a data collection component, a training component, and an inference component, and contains historical information regarding data objects and clients of the data protection system to continuously train a machine learning (ML) algorithm to determine an optimal cloning method as the selected cloning method.

7. The method of claim 6 wherein the data protection system comprises a deduplication backup system.

8. A system for selecting a cloning method for a replication service in a data protection system, the method comprising:
- a physical interface receiving the data of a saveset utilizing the replication service;
- a hardware-based processing component determining a data change rate of the data, as expressed as a number of bytes changed per unit of time;
- an estimator component selecting the cloning method from among a plurality of different cloning methods based on the data change rate, each performing a respective data replication operation at a defined time relative to a backup operation, and comprising parallel replication, serial replication, scheduled replication, manual replication, saveset replication, and volume replication;
- a hardware component defining a plurality of threshold ranges to select a cloning method from among the plurality of cloning methods, and selecting parallel replication if the data change rate is within a first threshold range, or serial replication if the data change rate is within a second threshold range, or scheduled replication if the data change rate is within a third threshold range, or one of saveset or volume replication if the data change rate is within a fourth scheduled threshold range; and
- a replication engine executing the selected cloning method for the replication service to copy the data for storage or further processing.

9. The system of claim 8 wherein the parallel replication copies the data in parallel with the backup operation, the serial replication copies the data after the backup operation, the scheduled replication copies the data at a scheduled time, the manual replication copies the data upon a manual trigger, the saveset replication copies the data saveset within a defined time range, and the volume replication copies a volume of the data saveset within the defined time range.

10. The system of claim 9 wherein each of the different cloning methods initiates the data copying at a respective defined time that imposes a corresponding latency to the replication operation.

11. The system of claim 10 wherein the selected cloning method minimizes an overall latency of the replication operation relative to other cloning methods of the plurality of cloning methods.

12. The system of claim 11 further comprising a model trained using historical data of backup operations of the saveset to establish past data change metrics for corresponding replication services processing the saveset.

13. The system of claim 12 wherein the model utilizes an artificial intelligence (AI) based component comprising a data collection component, a training component, and an inference component, and contains historical information regarding data objects and clients of the network data protection system to continuously train a machine learning (ML) algorithm to determine an optimal cloning method as the selected cloning method.

14. The system of claim 13 wherein the data protection system comprises a deduplication backup system.

* * * * *